US011587253B2

(12) United States Patent
Melnik et al.

(10) Patent No.: US 11,587,253 B2
(45) Date of Patent: Feb. 21, 2023

(54) METHOD, APPARATUS, AND COMPUTER PROGRAM PRODUCT FOR DISPLAYING VIRTUAL GRAPHICAL DATA BASED ON DIGITAL SIGNATURES

(71) Applicant: HERE Global B.V., Eindhoven (NL)

(72) Inventors: Ofer Melnik, Weehawken, NJ (US); Mark Thompson, Forest Park, WA (US); Alastair Sutherland, Seattle, WA (US)

(73) Assignee: HERE GLOBAL B.V., Eindhoven (NL)

( * ) Notice: Subject to any disclaimer, the term of this patent is extended or adjusted under 35 U.S.C. 154(b) by 56 days.

(21) Appl. No.: 17/132,876

(22) Filed: Dec. 23, 2020

(65) Prior Publication Data
US 2022/0198701 A1    Jun. 23, 2022

(51) Int. Cl.
*G06T 7/73*    (2017.01)
*G06F 21/64*    (2013.01)
(Continued)

(52) U.S. Cl.
CPC ............... *G06T 7/74* (2017.01); *G06F 21/64* (2013.01); *G06T 19/006* (2013.01); *H04L 9/3247* (2013.01)

(58) Field of Classification Search
CPC ......... G06T 7/74; G06T 19/006; G06F 21/64; H04L 9/3247
(Continued)

(56) References Cited

U.S. PATENT DOCUMENTS 8,131,118 B1    3/2012 Jing et al.
8,625,902 B2    1/2014 Baheti et al.
(Continued)

FOREIGN PATENT DOCUMENTS

CN    101535986 A    9/2009
CN    110263746 A    9/2019
(Continued)

OTHER PUBLICATIONS

Chaudhury et al., *Auto-Rectification Of Users Photos*, https://static.googleusercontent.com/media/research.google.com/en//pubs/archive/42532.pdf.
(Continued)

*Primary Examiner* — Gabriel I Garcia
(74) *Attorney, Agent, or Firm* — Alston & Bird LLP

(57) ABSTRACT

A method, apparatus and computer program product utilize digital signatures to efficiently identify objects of interest within images and cause graphical presentation data to be accurately displayed for the objects of interest. The method receives one or more images generated by an image capture device. The method determines one or more digital signatures associated with one or more objects within the one or more images. Based on the one or more digital signatures, the method also determines graphical data placement information comprising one or more graphical data placement regions for the one or more objects. The method also receives graphical presentation data comprising one or more graphical assets. The method also causes display of the graphical presentation data that includes overlaying at least one graphical asset of the one or more graphical assets on the at least one graphical data placement region.

20 Claims, 4 Drawing Sheets

(51) Int. Cl.
  *G06T 19/00* (2011.01)
  *H04L 9/32* (2006.01)
(58) Field of Classification Search
  USPC .................................................. 382/100, 154
  See application file for complete search history.

(56) References Cited

U.S. PATENT DOCUMENTS

| | | | |
|---|---|---|---|
| 10,726,312 | B2 | 7/2020 | Butt et al. |
| 11,113,587 | B2 | 9/2021 | Butt et al. |
| 2007/0005571 | A1 | 1/2007 | Brewer et al. |
| 2011/0060666 | A1* | 3/2011 | Gromek ............ G06Q 30/0643 715/833 |
| 2011/0135191 | A1 | 6/2011 | Lyuh et al. |
| 2012/0027290 | A1 | 2/2012 | Baheti et al. |
| 2012/0166074 | A1 | 6/2012 | Weng et al. |
| 2012/0294520 | A1 | 11/2012 | Mei et al. |
| 2014/0281945 | A1* | 9/2014 | Avni ..................... G06F 21/32 715/268 |
| 2018/0101730 | A1 | 4/2018 | Wu |
| 2018/0137551 | A1 | 5/2018 | Zheng et al. |
| 2018/0157939 | A1 | 6/2018 | Butt et al. |
| 2018/0204083 | A1 | 7/2018 | Goyal et al. |
| 2018/0225514 | A1 | 8/2018 | Anastassacos et al. |
| 2018/0227482 | A1 | 8/2018 | Holzer et al. |
| 2019/0073553 | A1 | 3/2019 | Yao et al. |
| 2019/0147655 | A1* | 5/2019 | Galera ................... G06T 15/20 345/419 |
| 2019/0303725 | A1 | 10/2019 | Gurvich et al. |
| 2020/0005542 | A1 | 1/2020 | Kocharlakota et al. |
| 2020/0193206 | A1 | 6/2020 | Turkelson et al. |
| 2020/0234466 | A1 | 7/2020 | Holzer et al. |
| 2020/0320356 | A1 | 10/2020 | Butt et al. |
| 2020/0402541 | A1* | 12/2020 | Talbot ................... G06V 10/82 |
| 2021/0004589 | A1 | 1/2021 | Turkelson et al. |
| 2021/0056761 | A1 | 2/2021 | Nigam et al. |
| 2021/0174113 | A1 | 6/2021 | Shin et al. |
| 2022/0188346 | A1 | 6/2022 | Melnik et al. |
| 2022/0198215 | A1 | 6/2022 | Melnik et al. |
| 2022/0198701 | A1 | 6/2022 | Melnik et al. |
| 2022/0198721 | A1 | 6/2022 | Melnik et al. |

FOREIGN PATENT DOCUMENTS

| | | | |
|---|---|---|---|
| KR | 102266996 | B1 | 6/2021 |
| WO | WO 2018/031050 | A1 | 2/2018 |
| WO | WO 2020/020472 | A1 | 1/2020 |

OTHER PUBLICATIONS

Nirikin et al., "HyperSeg: Patch-Wise Hypernetwork for Real-Time Semantic Segmentation", 2021 IEEE/CVF Conference on Computer Vision and Pattern Recognition (CVPR), arXiv:2012.11582v2, (Apr. 8, 2021), 15 pages.
U.S. Appl. No. 17/123,935, filed Dec. 16, 2020, In re: Melnik et al. entitled, "Method, Apparatus, and Computer Program Product for Training a Signature Encoding Module and a Query Processing Module To Identify Objects Of Interest Within An Image Utilizing Digital Signatures".
U.S. Appl. No. 17/123,485, filed Dec. 16, 2020, In re: Melnik et al. entitled, "Method, Apparatus, And Computer Program Product For Identifying Objects Of Interest Within An Image Captured By A Relocatable Image Capture Device".
U.S. Appl. No. 17/132,911, filed Dec. 23, 2020, In re: Melnik et al. entitled, "Method, Apparatus, And Computer Program Product For Training A Signature Encoding Module And A Query Processing Module Using Augmented Data".
U.S. Appl. No. 17/132,860, filed Dec. 23, 2020, In re: Melnik et al. entitled, "Method, Apparatus, And Computer Program Product For Change Detection Based On Digital Signatures".
Alfarrarjeh et al., "A Data-Centric Approach for Image Scene Localization", 2018 IEEE International Conference on Big Data, (Dec. 10-13, 2018), pp. 594-603.
Extended European Search Report for European Application No. 21214679.9 dated May 13, 2022, 12 pages.
Extended European Search Report for European Application No. 21214761.5 dated May 13, 2022, 12 pages.
Extended European Search Report for European Application No. 21216006.3 dated May 23, 2022, 8 pages.
Extended European Search Report for European Application No. 21216037.8 dated Jun. 7, 2022, 7 pages.
Hu et al., "ALPS Accurate Landmark Positioning at City Scales", ACM International Joint Conference on Pervasive and Ubiquitous Computing (UbiComp 2016), (Jul. 2016), 12 pages.
Luo et al., "Geotagging in Multimedia and Computer Vision—A Survey", Multimed Tools Appl, (Oct. 19, 2010), 25 pages.
Sagrebin et al., "Real-Time Moving Object Detection for Video Surveillance", 2009 Sixth IEEE International Conference on Advanced Video and Signal Based Surveillance, (Sep. 2-4, 2009), 6 pages.
Zhang et al., "Parallel Connecting Deep Shallow CNNs for Simultaneous Detection of Big and Small Objects", Pattern Recognition and Computer Vision (PRCV 2018), Lecture Notes in Computer Science, (Nov. 2, 2018), 12 pages.
Office Action for U.S. Appl. No. 17/123,485 dated Aug. 2, 2022.
Final Office Action for U.S. Appl. No. 17/123,485 dated Dec. 5, 2022.

\* cited by examiner

METHOD, APPARATUS, AND COMPUTER PROGRAM PRODUCT FOR DISPLAYING VIRTUAL GRAPHICAL DATA BASED ON DIGITAL SIGNATURES

TECHNOLOGICAL FIELD

An example embodiment relates generally to a method, apparatus, and computer program product for displaying graphical presentation data and, more particularly, for efficient management of graphical presentation data by utilizing digital signatures to identify graphical data placement information.

BACKGROUND

Applications of Augmented Reality (AR) may involve superimposing a computer-generated image on a user's view of the real world, thus providing a composite view. In some examples, three-dimensional (3D) video may be enhanced in real-time by overlaying a camera image with additional graphical presentation data (e.g., text, images, and/or the like). The graphical presentation data may be related to what is being shown in the video.

In some examples, an AR environment may not be sufficiently defined to permit the most appropriate graphical presentation data to be identified, thereby potentially causing graphical presentation data to be presented in an undesirable manner. Further, certain environmental conditions, such as lighting, weather, seasonal effects and/or the like, may affect the appearance of the environment such that graphical presentation data overlaid onto an object from a video may appear unnatural or distracting, such as in instances in which the graphical presentation data was created under different environmental conditions.

BRIEF SUMMARY

A method, apparatus and computer program product are therefore provided in accordance with an example embodiment in order to utilize digital signatures to efficiently identify objects of interest within images and cause graphical presentation data to be accurately displayed in association therewith. Embodiments herein may utilize portable compact signatures that allow objects of interest and regions on which to overlay graphical presentation data to be recognized within images in an efficient manner. As such, real-time or near real-time detection of such objects and regions within images and subsequent display of graphical presentation data may be performed faster, more accurately, and more efficiently than other approaches, such as approaches that utilize three-dimensional (3D) models and perform 3D localization for data stored in a 3D point cloud which may require exhaustive back end processing.

In an embodiment, a method is provided that includes receiving one or more images generated by an image capture device. The method also includes determining one or more digital signatures associated with one or more objects within the one or more images. The method also includes determining, based on the one or more digital signatures, graphical data placement information comprising one or more graphical data placement regions for the one or more objects. The method also includes receiving graphical presentation data comprising one or more graphical assets. The method further includes causing display of the graphical presentation data, wherein causing display comprises overlaying at least one graphical asset of the one or more graphical assets on the at least one graphical data placement region.

In some embodiments, the method also includes causing transmission of the graphical data placement information to a graphical presentation data marketplace service. In this embodiment, the graphical presentation data is received from the graphical presentation data marketplace service. The method may also include determining environmental data associated with the one or more images. In some embodiments, the method also includes altering the at least one graphical asset overlaid on the at least one graphical data placement region based at least on the environmental data. The environmental data may include at least one of a time of day, a weather status, or a lighting condition for the one or more images.

In some embodiments of the method, altering the at least one graphical asset comprises replacing the at least one graphical asset with another graphical asset of the one or more graphical assets. In this embodiment, the another graphical asset is selected based on the environmental data. The method may also include receiving position information associated with the image capture device comprising at least one of a position or orientation of the image capture device. In this embodiment the received graphical presentation data is further based on the position information. In some embodiments of the method, the graphical data placement information further comprises positioning information associated with the one or more graphical data placement regions and demographic data associated with a user of the image capture device.

In another embodiment, an apparatus is provided that includes processing circuitry and at least one memory including computer program code instructions with the computer program code instructions configured to, when executed by the processing circuity, cause the apparatus to receive one or more images generated by an image capture device. The computer program code instructions are also configured to, when executed by the processing circuity, cause the apparatus to determine one or more digital signatures associated with one or more objects within the one or more images. The computer program code instructions are also configured to, when executed by the processing circuity, cause the apparatus to determine, based on the one or more digital signatures, graphical data placement information comprising one or more graphical data placement regions for the one or more objects. The computer program code instructions are further configured to, when executed by the processing circuity, cause the apparatus to receive graphical presentation data comprising one or more graphical assets. The computer program code instructions are also configured to, when executed by the processing circuity, cause the apparatus to cause display of the graphical presentation data. In this regard, causing display comprises overlaying at least one graphical asset of the one or more graphical assets on the at least one graphical data placement region.

In some embodiments, the computer program code instructions are further configured to, when executed by the processing circuity, cause the apparatus to cause transmission of the graphical data placement information to a graphical presentation data marketplace service. In this regard, the graphical presentation data is received from the graphical presentation data marketplace service. The computer program code instructions may be further configured to, when executed by the processing circuity, cause the apparatus to determine environmental data associated with the one or more images. In some embodiments, the computer program code instructions are further configured to, when executed by the processing circuitry, cause the apparatus to alter the at least one graphical asset overlaid on the at least one graphical data placement region based at least on the environmental data. The environmental data may include at least one of a time of day, a weather status, or a lighting condition for the one or more images.

In some embodiments of the apparatus, altering the at least one graphical asset comprises replacing the at least one graphical asset with another graphical asset of the one or more graphical assets. In this regard, the another graphical asset is selected based on the environmental data. In some embodiments of the apparatus, the computer program code instructions are further configured to, when executed by the processing circuitry, cause the apparatus to receive position information associated with the image capture device comprising at least one of a position or orientation of the image capture device. In this regard, the received graphical presentation data is further based on the position information. The graphical data placement information may also include positioning information associated with the one or more graphical data placement regions and demographic data associated with a user of the image capture device.

In another embodiment, a computer program product is provided that includes at least one non-transitory computer-readable storage medium having computer-executable program code instructions stored therein with the computer-executable program code instructions comprising program code instructions configured to receive one or more images generated by an image capture device. The computer-executable program code instructions also comprise program code instructions configured to determine one or more digital signatures associated with one or more objects within the one or more images. The computer-executable program code instructions also comprise program code instructions configured to determine, based on the one or more digital signatures, graphical data placement information comprising one or more graphical data placement regions for the one or more objects. The computer-executable program code instructions further comprise program code instructions configured to receive graphical presentation data comprising one or more graphical assets. The computer-executable program code instructions also comprise program code instructions configured to cause display of the graphical presentation data, wherein causing display comprises overlaying at least one graphical asset of the one or more graphical assets on the at least one graphical data placement region.

In some embodiments, the computer-executable program code instructions further comprise program code instructions configured to cause transmission of the graphical data placement information to a graphical presentation data marketplace service. In this regard, the graphical presentation data is received from the graphical presentation data marketplace service. The computer-executable program code instructions of an example embodiment further comprise program code instructions configured to determine environmental data associated with the one or more images. In some embodiments, the computer-executable program code instructions further comprise program code instructions configured to alter the at least one graphical asset overlaid on the at least one graphical data placement region based at least on the environmental data. The environmental data may include at least one of a time of day, a weather status, or a lighting condition for the one or more images.

In some embodiments of the computer program product, altering the at least one graphical asset comprises replacing the at least one graphical asset with another graphical asset of the one or more graphical assets. In this regard, the another graphical asset is selected based on the environmental data. The computer-executable program code instructions of an example embodiment further comprise program code instructions configured to receive position information associated with the image capture device comprising at least one of a position or orientation of the image capture device. In this regard, the received graphical presentation data is further based on the position information. In some embodiments of the computer program product, the graphical data placement information further comprises positioning information associated with the one or more graphical data placement regions and demographic data associated with a user of the image capture device.

In another embodiment, an apparatus is provided that includes means for receiving one or more images generated by an image capture device. The apparatus also includes means for determining one or more digital signatures associated with one or more objects within the one or more images. The apparatus also includes means for determining, based on the one or more digital signatures, graphical data placement information comprising one or more graphical data placement regions for the one or more objects. The apparatus further includes means for receiving graphical presentation data comprising one or more graphical assets. The apparatus also includes means for causing display of the graphical presentation data, wherein causing display comprises overlaying at least one graphical asset of the one or more graphical assets on the at least one graphical data placement region.

In some embodiments, the apparatus also includes means for causing transmission of the graphical data placement information to a graphical presentation data marketplace service. In this regard, the graphical presentation data is received from the graphical presentation data marketplace service. The apparatus of an example embodiment also includes means for determining environmental data associated with the one or more images. In some embodiments, the apparatus also includes means for altering the at least one graphical asset overlaid on the at least one graphical data placement region based at least on the environmental data. The environmental data may include at least one of a time of day, a weather status, or a lighting condition for the one or more images.

In some embodiments of the apparatus, altering the at least one graphical asset comprises replacing the at least one graphical asset with another graphical asset of the one or more graphical assets. In this regard, the another graphical asset is selected based on the environmental data. The apparatus of an example embodiment also includes means for receiving position information associated with the image capture device comprising at least one of a position or orientation of the image capture device. In this regard, the received graphical presentation data is further based on the position information. In some embodiments of the apparatus, the graphical data placement information further comprises positioning information associated with the one or more graphical data placement regions and demographic data associated with a user of the image capture device.

BRIEF DESCRIPTION OF THE DRAWINGS

Figure 1:
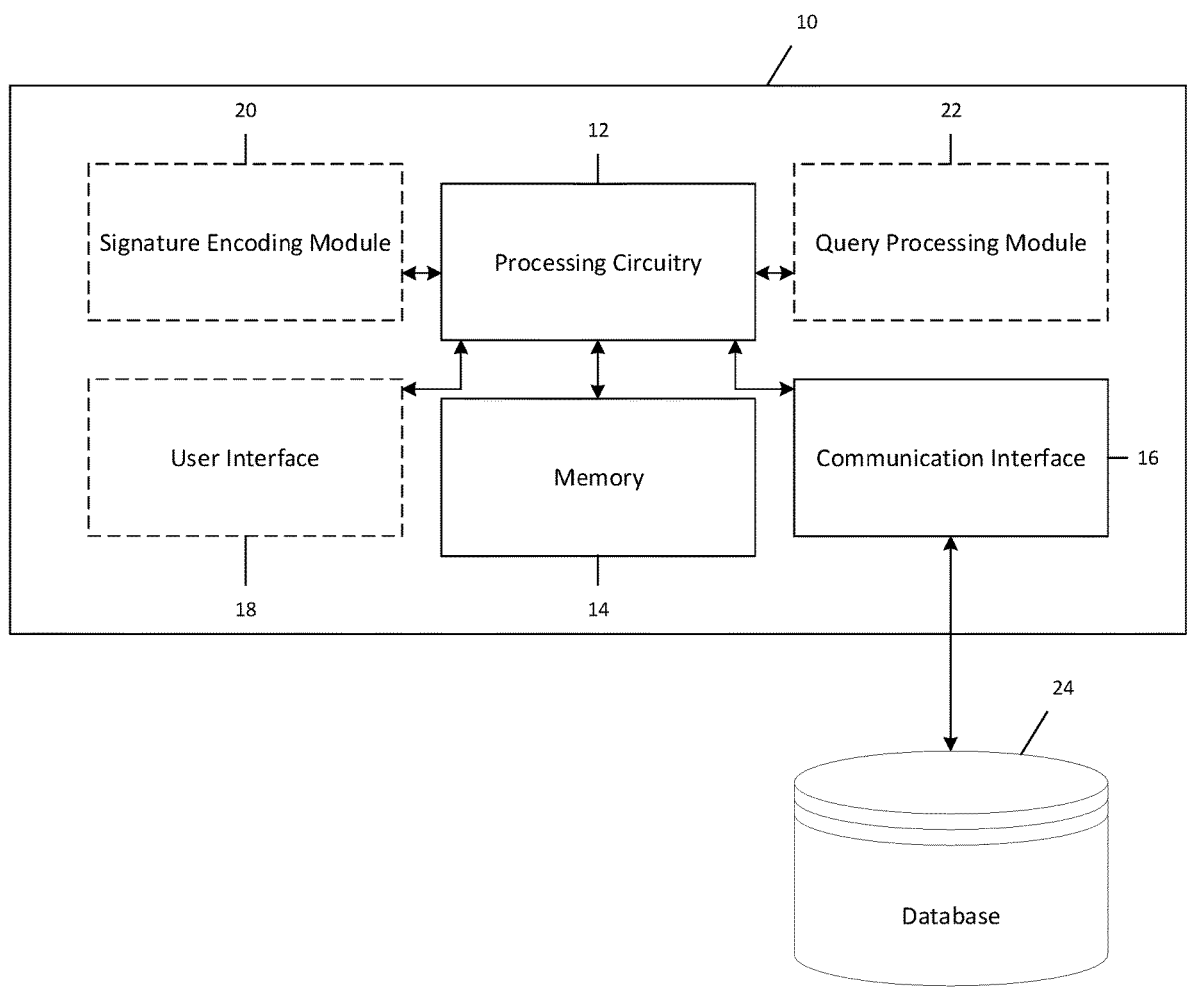
Figure 2:
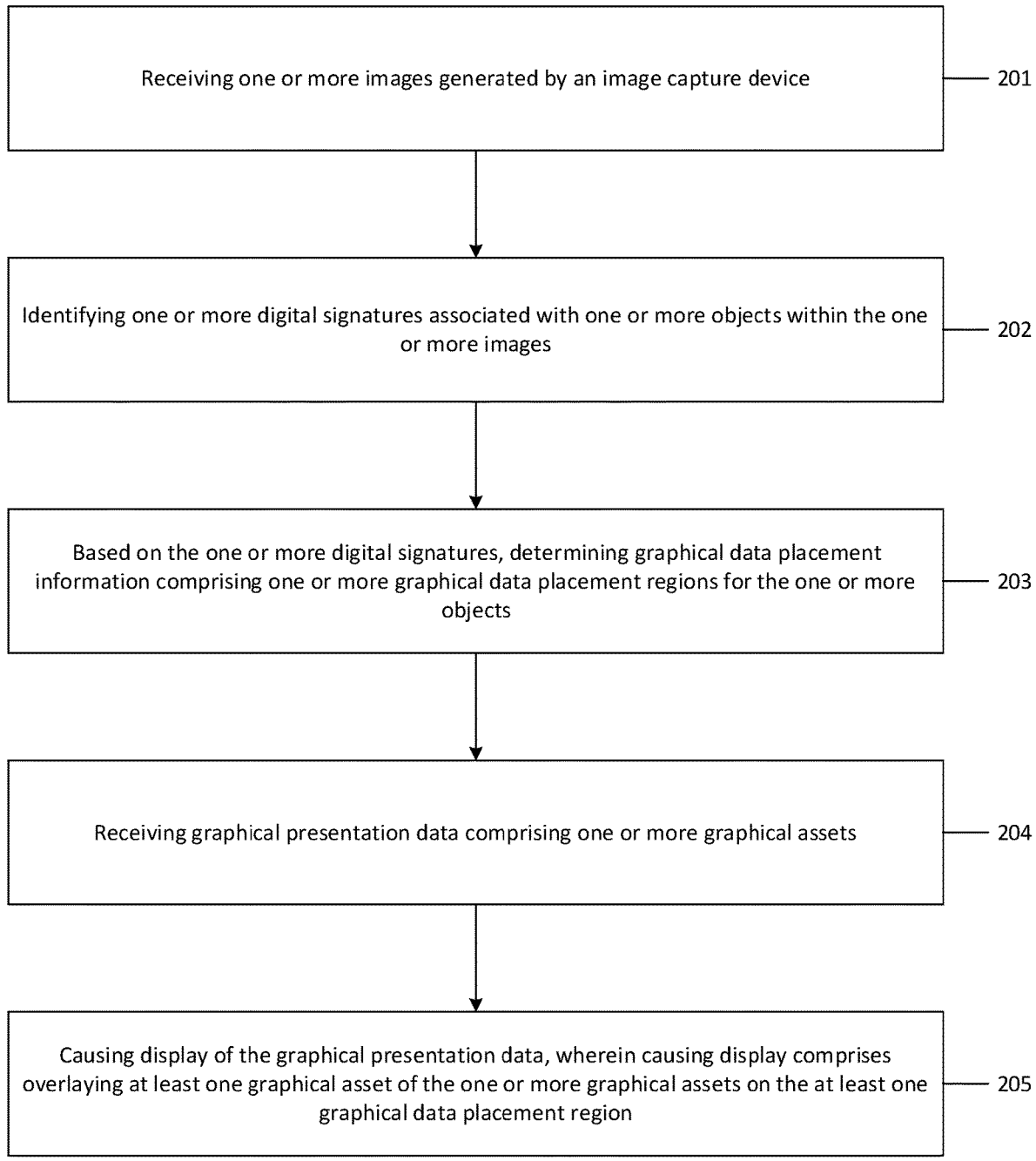
Figure 3:
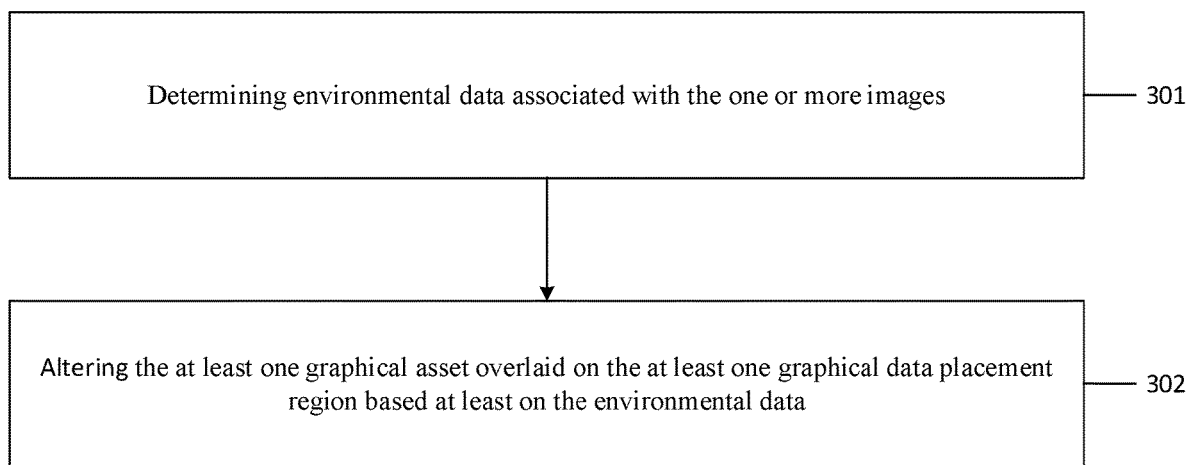
Figure 4:
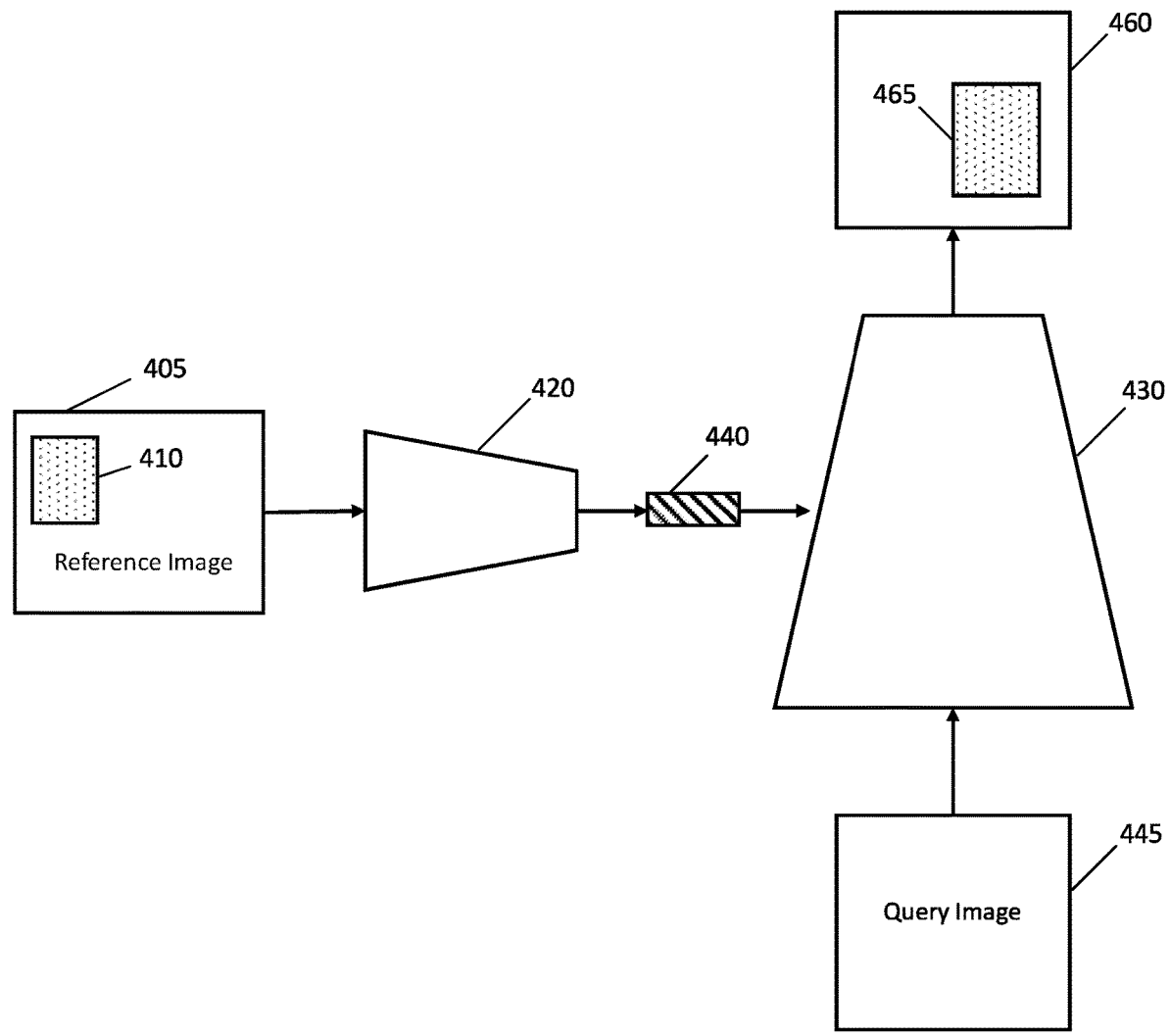

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment;

FIG. 2 is a flowchart illustrating the operations performed, such as by the apparatus of FIG. 1, in accordance with an example embodiment;

FIG. 3 is a flowchart illustrating the operations performed, such as by the apparatus of FIG. 1, in accordance with another example embodiment; and FIG. 4 is a graphical representation of operations performed, such as by the apparatus of FIG. 1, for training a signature encoding module and query processing module in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to identify graphical data placement information related to objects of interest within an image and cause presentation of graphical presentation data based on the graphical data placement information and further to alter the presentation based on additional factors, such as environmental conditions and/or additional information related to the image, the image capture device, and/or the user associated with the image and/or image capture device.

In some embodiments, an object of interest within an image may be identified based upon respective digital signatures of one or more objects of interest and at least some context associated with the one or more objects of interest that are depicted by one or more images. The object of interest within the image may be identified by a query processing module comprising a neural network that has been trained as described below to recognize the object of interest utilizing the respective digital signature of the one or more objects of interest and at least some context associated with the one or more objects of interest that are depicted by one or more reference images that have been identified. In this regard, the method, apparatus, and computer program product may be configured to utilize a trained query processing module to identify objects of interest within an image. Although described herein to represent an object of interest and at least some context associated with the object of interest, a digital signature need not represent context associated with the object of interest and, in other embodiments, may exclusively represent an object of interest. Thus, the following discussion relating to an object of interest and context associated with the object of interest is equally applicable with respect to consideration of an object of interest itself without consideration of any associated context.

The apparatus that is configured to identify graphical data placement information for objects of interest within an image based upon digital signatures may be any of a wide variety of computing devices. For example, the apparatus may be embodied by a server, a computer workstation, a distributed network of computing devices, a personal computer, a navigation or mapping system, a head-mounted display device, an AR device, a gaming system or any other type of computing device.

Regardless of the manner in which the apparatus is embodied, however, the apparatus 10 includes, is associated with, or is in communication with processing circuitry 12, memory 14, a communication interface 16, a query processing module 22, and optionally a user interface 18 and a signature encoding module 20, as shown in FIG. 1. In some embodiments, the processing circuitry 12 (and/or co-processors or any other processors assisting or otherwise associated with the processing circuitry) can be in communication with the memory 14 via a bus for passing information among components of the apparatus. The memory 14 can be non-transitory and can include, for example, one or more volatile and/or non-volatile memories. In other words, for example, the memory 14 may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory 14 can be configured to buffer input data for processing by the processing circuitry 12. Additionally or alternatively, the memory can be configured to store instructions for execution by the processing circuitry.

The processing circuitry 12 can be embodied in a number of different ways. For example, the processing circuitry 12 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 12 can include one or more processing cores configured to perform independently. A multi-core processor can enable multiprocessing within a single physical package. Additionally or alternatively, the processing circuitry 12 can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry 12 can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., map data, route data, etc.) generated and/or employed by the processing circuitry 12. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to infrastructure wireless links.

Although not illustrated, the apparatus 10 may also include or be in communication with one or more a positioning system, such as a global positioning system (GPS) and/or other localization system. As such, the apparatus 10, such as the processing circuitry 12, may be configured to determine its location, such as upon capture of an image, based upon information provided by the positioning system.

The apparatus 10 may also optionally comprise a signature encoding module 20. The signature encoding module may be configured to perform operations associated with generating a digital signature of an object of interest and associated context. As described below, during training, the signature encoding module 20 may receive, as input, a reference image that includes an object of interest that has been demarcated and be trained to provide, as output, a digital signature representing the object of interest and at least some of the context associated with the object of interest.

The apparatus 10 may also comprise a query processing module 22. The query processing module 22 may be configured to perform operations associated with identifying an object of interest within an image based upon respective digital signatures of one or more objects of interest and at least some context associated with the one or more objects of interest that are depicted by one or more reference images. The query processing module 22 may be a trained to identify objects of interest within images. As described in more detail below, during training, the query processing module may receive, as input, one or more query images in addition to a digital signature of a respective object of interest, such as a digital signature generated by the signature encoding module 20 and stored by the memory 14 and/or a database 24. Based thereupon, the query processing module may be trained to predict a location in the one or more query images that contains the object of interest. Once trained, the query processing module may be configured to efficiently identify an object of interest within an image based upon respective digital signatures of one or more objects of interest and at least some context associated with the one or more objects of interest that are depicted by one or more reference images.

Although depicted in FIG. 1 to be distinct from the processing circuitry 12, the signature encoding module 20 and/or the query processing module 22 may be embodied by the processing circuitry in other example embodiments.

In some embodiments, the database 24 may be configured to store representations of a plurality of images and associated metadata. In some embodiments, the representations of the plurality of images may be encoded representations, such as the hash codes, generated for the respective images, although different or additional representations of the images may be stored in the database in other embodiments including storage of the images themselves. The metadata for the plurality of images may comprise location data (e.g., global positioning system (GPS) coordinates) that defines the location at which the image was taken, time and date information indicative of a time and/or date at which an image was captured. The metadata for the plurality of images may also comprise camera-related information, such as a camera pose and/or position at the time that the image was captured and/or other camera-related information.

The database 24 may also store one or more digital signatures associated with respective images. The digital signatures are representative of an object of interest within a respective image, as well as at least some of the context associated with the object of interest within the image. One or more digital signatures may be associated with each image. In an embodiment in which multiple digital signatures are associated with a respective image, each digital signature may be representative of a different object of interest and at least some context associated therewith within the object of interest. The digital signatures may have been generated by the signature encoding module 20, as described in more detail below. The database may also comprise data related to graphical data placement regions associated with digital signatures that are associated with a respective image, such as location of the placement regions on or around the object of interest associated with the digital signature, dimensions and/or sizing information of the placement regions, and/or the like.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Referring now to FIG. 2, the operations performed, such as by the apparatus 10 of FIG. 1, in order to identify objects of interest within an image using digital signatures and cause display of graphical presentation data for the objects of interest are depicted. As shown in block 201, the apparatus includes means, such as the processing circuitry 12, memory 14, communication interface 16, and/or the like, for receiving one or more images generated by an image capture device. The one or more images may be received from a source external to and in communication with the apparatus (e.g., by way of communication interface 16), such as an image capture device, or, in some embodiments, the image may be received from the database 24 or memory 14 that store one or more images captured by the image capture device, and/or from other sources. Although the apparatus may receive a plurality of images that are processed concurrently or in combination with one another, the apparatus will be described below in relation to the receipt and processing of single image by way of example, but not of limitation.

For example, the image may be a photograph or frame of a video generated by an image capture device, such as a camera, video camera, or the like. In some embodiments, the image capture device may be an image capture device that is configured to be relocated. In this regard, the image capture device may be relocated due to the image capture device being stationed onboard, carried by or embodied by a moving entity, such as a vehicle, person (e.g., a head-mounted display), or the like. For example, the image may depict real-world content and may include one or more objects of interest that can be identified by embodiments described herein.

In some embodiments, the apparatus 10 includes means, such as the processing circuitry 12, memory 14, communication interface 16, and/or the like, for receiving information regarding an estimated location of the image capture device, such as based upon information provided by an associated positioning system. For example, in some embodiments, the image that is received may be associated with metadata comprising information about the image. For example, the metadata may include location data indicative of a location at which the image was generated. As one example, the location data may comprise a pair of coordinates (e.g., latitudinal/longitudinal coordinates) indicative of a particular location at which the image was generated, such as the location of the image capture device at the time that the image was captured. Additional metadata may include information related to a position and/or an orientation, e.g., pose, of the image capture device at the time the image was generated, and/or historical information related to one or more previous locations of the image capture device.

In some embodiments, the apparatus 10 includes means, such as the processing circuitry 12, memory 14, and/or the like, for determining the estimated location based on data associated with the received image. For example, metadata associated with the image as described above and information associated with previous locations of the image capture device (e.g., based on location data of previous images taken by the image capture device) may be combined using a filter, such as a Kalman filter, in order to determine an estimated location of the image capture device.

At operation 202, the apparatus 10 includes means, such as the processing circuitry 12, memory 14, signature encoding module 20, query processing module 22, and/or the like, for, determining one or more digital signatures associated with one or more objects within the one or more images. For example, a digital signature for an object within the image may be determined for the object and for at least some context associated with the object. In some embodiments, an object within the image may be automatically identified, e.g., through one or more image recognition processes. In some embodiments, an object within the image may be demarcated, e.g., by a user operating the image capture device, prior to the image being received by the apparatus 10.

As described herein, "context" may refer to a portion of an image that is near to, such as by being adjacent to, proximate or surrounding, the object of interest. For example, in an instance in which the object of interest in an image is a particular building, the context may comprise one or more buildings or other objects that are in close proximity to the particular building. In an embodiment in which the object of interest is demarcated, such as with an image mask, the context is generally represented by a portion of the reference image that is outside of, but adjacent or otherwise proximate or near to the image mask. Embodiments herein describe an object of interest that is stationary (e.g., a building), as well as context surrounding the object of interest being also stationary (e.g., neighboring buildings, locations, or the like). Since the object of interest is stationary, the stationary context surrounding the object of interest may be considered in conjunction with the identification of the object of interest in contrast to the identification or recognition of mobile or deformable objects of interest, which cannot rely upon the context in the vicinity thereof since the context may change based upon the mobility or deformability of these other object of interest. The context is typically implicit and need not be specifically designated as such.

In some embodiments, the digital signature may be generated using a signature encoding module 20, further described below, that comprises a plurality of neural network layers configured to decompose the image and a representation therein of the object of interest and at least some of the context associated with the object of interest to extract features therefrom and to derive a digital signature representing a combination of the object of interest and at least some of the context associated with the object of interest. For example, in some embodiments, the digital signature may be derived based on the object of interest and at least some context associated with the object of interest, such as one or more objects in the reference image other than the object of interest. In this regard, the apparatus, such as the signature encoding module 20, is configured to generate the digital signature by analyzing the image at different (e.g., higher) resolutions and extracting additional features from the reference image as the reference image is advanced from a courser resolution processed by one neural network layer to a finer resolution processed by another, subsequent neural network layer.

In some embodiments, the digital signature may comprise a sequence of bits and bytes unique to the object of interest and the associated context. In this regard, the digital signature may be derived based on both the object of interest and at least some of its context such that different digital signatures would be generated for identical objects of interest if those objects of interest were in different locations with different context associated therewith.

Once a digital signature is generated, additional information regarding the object of interest for which the digital signature was generated may be determined. In this regard, at operation 302, the apparatus 10 includes means, such as the processing circuitry 12, memory 14, and/or the like, for determining, based on the one or more digital signatures, graphical data placement information comprising one or more graphical data placement regions for the one or more objects. For example, using the digital signature determined for the received image, the apparatus 10, such as the processing circuitry 12, may access the memory 14 or a database (e.g., database 24) in order to determine whether the object has been previously identified (e.g., a same or similar digital signature is stored) and if so, additionally whether graphical data placement information is stored in association with the digital signature.

In some embodiments, digital signatures stored in the database 24 may be stored in association with location information, for example, latitude and longitude coordinates, that identify where the particular object associated with the digital signature is located. In order to increase the efficiency with which the same or similar stored digital signature is identified, the apparatus 10 may access and search only a portion of the database, e.g., stored digital signatures, that have been identified to be proximate to, such as within a predefined distance of, the estimated location of the image capture device at the time at which the received image was captured.

A determined digital signature of the image may be determined to match a stored digital signature in an instance in which the determined digital signature identically matches the stored digital signature or, alternatively, in an instance in which the determined digital signature matches the stored digital signature by satisfying a predefined threshold. In this regard, the apparatus 10 may also include means, such as the processing circuitry 12, memory 14, and/or the like, for comparing the determined digital signature to a stored digital signature. For example, the database 24 may store a plurality of digital signatures. In one non-limiting example, the apparatus 10 may determine that a determined digital signature for an object matches a stored digital signature in an instance in which over predefined threshold, e.g., over 90 percent, of the determined digital signature matches the stored digital signature.

In some embodiments, the apparatus 10, such as the processing circuitry 12, may be configured to compare a determined digital signature to a stored digital signature based upon distance between the signatures. In this embodiment, the apparatus 10, such as the processing circuitry 12, is configured to determine the distance between the determined digital signature and the stored digital signature, such as based upon a predefined distance function, and to then compare the distance that has been determined to a predefined threshold to determine if the signatures match in an instance in which the distance is less than the predefined threshold.

Once the determined digital signature has been matched to a stored digital signature, data associated with the stored digital signature may be accessed to determine graphical data placement information. In this regard, at operation 203, the apparatus 10 includes means, such as the processing circuitry 12, memory 14, and/or the like, for determining, based on the one or more digital signatures, graphical data placement information comprising one or more graphical data placement regions for the one or more objects.

Graphical data placement information may include indications of one or more graphical data placement regions, such as particular areas on or around the object of interest which can be overlaid with graphical presentation data, for example, based on the sub-objects of interest of the object. Alternatively, in some embodiments, the graphical data placement regions for the object may be determined using one or more image rectification processes that utilize regularities common to a particular type of object (e.g., window and/or door edges of buildings) to identify graphical data placement regions and their associated received or inferred orientation and/or position information. In some embodiments, such as wherein objects of interest detected by signatures are also mapped within a map (e.g., a two-dimensional (2D) or three-dimensional (3D) map), localization of the signature(s) within an image may be used to position a viewer (or representation of a viewer) of the map within the map. In this regard, the determination of graphical data placement information may be based on the position of the viewer within the map, such as in various AR applications.

The determination of graphical data placement information may also include the determination of additional information, such as permission data for the object, position and/or orientation information of the image capture device at the time the image depicting the object was taken (e.g., based on metadata of the image as described above or inferred by the apparatus 10), positioning information for the graphical data placement region (e.g., sizing and/or dimensions of the graphical data placement regions), and/or other additional data. For example, in some embodiments, graphical data placement information may also include information regarding a user of the image capture device with which the image was captured, for example, demographic information of a user including age, gender, address information, and/or the like as defined by metadata of the image captured by the user's image capture device.

In an example embodiment in which the object of interest is a building, examples of graphical data placement regions for the building may include one or more façades located on the building, a roofline of the building, surfaces around one or more doors and/or windows of the building, one or more open spaces around the building (e.g., within an area in front of the building), and/or the like.

In some embodiments, data that is stored in association with the stored digital signature may include permission data that includes indications as to whether or not graphical presentation data may be overlaid on or around the object of interest. For example, certain businesses and/or entities associated with the object of interest (e.g., a building) may define permission data that may limit what type of graphical presentation data can be displayed on graphical data placement regions of the building, define particular times at which graphical presentation data may be displayed on or around the building, or prevent graphical presentation data from being presented on or around the building at all.

Permission data that includes data that may limit what type of graphical presentation data can be displayed on graphical data placement regions of the building may include indications of certain entities (e.g., businesses, agencies, etc.) that are permitted to display graphical presentation data on graphical data placement regions of the object. As one non-limiting example, a business or other entity that owns or is otherwise associated with the object (e.g., a building) may have pre-established contracts with one or more agencies (e.g., advertising agencies) that allow the agencies to virtually display graphical presentation data in the form of advertisements on or around the building. In this regard, a user viewing the object in the real world may not see the advertising, whereas a user viewing the building through a head-mounted AR display may see the advertising virtually overlaid on a façade of the building, for example. In some embodiments, rather than an outside agency, the business or entity associated with the object may desire its own graphical presentation data to be virtually displayed and include permission data tailored to the particular business or entity of the object. For example, a particular business may virtually display an arrow pointing toward the building as a technique for directing a viewer to the building. As another example, an object, such as a sports arena, may desire to virtually display a team mascot in front of the arena.

Once the graphical data placement information as described above is determined for a particular object, graphical presentation data can be accessed or retrieved based on the graphical data placement information. For example, once the object of interest is identified (e.g., based on digital signatures as described above) and graphical data placement information associated with the object is determined (e.g., including one or more of permission data, graphical data placement region(s) and associated sizing and/or dimension data, user demographic data, and camera position and/or orientation information), graphical presentation data may be received, retrieved, or otherwise accessed based on the graphical data placement information.

At operation 204, the apparatus 10 includes means, such as the processing circuitry 12, memory 14, and/or the like, for receiving graphical presentation data comprising one or more graphical assets. Graphical presentation data may comprise one or more graphical assets that are to be overlaid on one or more graphical data placement regions.

The one or more graphical assets may be based on the graphical data placement information. For example, based on permission data of the graphical data placement information, the graphical assets that are received may be associated with a particular type of graphical presentation data. For example, permission data may define that graphical presentation data that is permitted to be overlaid on a particular building may only be associated with a particular agency, such as a particular advertising agency, e.g., based on a pre-established contract. In other words, only virtual advertisements for a particular advertisement agency may be overlaid on graphical data placement regions of the building.

Continuing with the above example, the graphical assets that are received may be further based on user demographic data of the graphical data placement information. For example, user demographic data indicative that the user of the image capture device is between the ages of 12-18 may result in graphical assets in the form of advertisements targeted to a teenage demographic to be received. Additionally or alternatively, user profiling of the user may determine the graphical assets that are received. For example, the web history of a user, including data such as previous search history, estimated likes and/or dislikes (e.g., through social media) and/or other similar information may be used to determine graphical assets that are shown to the user. Continuing further with this example, the graphical assets that are received may be further based on camera position and/or orientation included in the graphical data placement information. For example, in a scenario in which a graphical asset of an arrow is to be overlaid on or near a building such that the arrow points to the building in order to direct a person to the building, the arrow graphical asset that is received may depend on what direction the user is approaching the building from. For example, if the building is ahead and to the right of the user, a right-facing arrow may be received. If the building is ahead and to the left of the user, a left facing arrow graphical asset may be received. Continuing further, the graphical assets that are received may be further based on the sizing or dimension-related information for one or more graphical data placement regions that is included in the graphical data placement information. For example, some graphical assets may be sized to be overlaid on a rectangular façade (e.g., a 2D advertisement), whereas other graphical assets may be configured to be displayed in front of the building, such as a 3D team mascot graphical asset in front of a sports arena. Continuing further, the graphical assets that are received may be further based on one or more needs of an entity associated with the object on which the graphical assets will be displayed. For example, a clothing store may present graphical assets depicting items that have a high inventory count at the store or items that are currently on sale.

The graphical presentation data comprising the one or more graphical assets may be received from a variety of sources. For example, the graphical presentation data may be received from a third-party service such as a graphical presentation data marketplace service. For example, a graphical presentation data marketplace service may be configured to determine graphical assets to be displayed for particular objects based on received graphical data placement information. In this regard, the marketplace service may connect entities such as advertising agencies to businesses and their associated objects (e.g., buildings, storefronts, etc.) in order to provide graphical assets to be overlaid on the objects. In this regard, in some embodiments, the apparatus 10 includes means, such as the processing circuitry 12, memory 14, and/or the like, for causing transmission of the graphical data placement information to a graphical presentation data marketplace service. In this regard, the graphical presentation data marketplace service may determine graphical presentation data including one or more graphical assets based on the graphical data placement information determined by and received from the apparatus 10.

Once the graphical presentation data is received, at operation 205, the apparatus 10 includes means, such as the processing circuitry 12, memory 14, user interface 18 and/or the like, for causing display of the graphical presentation data. In this regard, the apparatus 10, such as the processing circuitry 12 and/or user interface 18, may cause display of the graphical presentation data by overlaying at least one graphical asset of the one or more graphical assets on the at least one graphical data placement region. In this regard, one or more graphical assets may be overlaid on one or more graphical data placement regions such that additional information is added to the augmented reality environment for viewing.

In some embodiments, various conditions may influence how the graphical assets are overlaid and/or displayed. Turning to FIG. 3, at operation 301, the apparatus 10 includes means, such as the processing circuitry 12, memory 14, and/or the like, for determining environmental data associated with one or more images captured of the particular object of interest. In this regard, based on metadata associated with the images, such as location information and/or time information, the apparatus 10, such as the processing circuitry 12, may determine environmental data such as a time of day or year at which the image was taken (e.g., during a holiday season), a lighting condition of the image (e.g., bright images taken outside, additional lighting affecting the image (e.g., neon lighting or brightly lit displays such as in Times Square) or dimly lit images taken in an interior space), a weather status (e.g., rain, snow, etc.) of the environment in which the image was taken (e.g., based on current weather reporting information associated with the location and time of the image) and/or seasonal information, one or more incidents at or surrounding the object of interest, (e.g., a traffic accident).

In this regard, in some embodiments, at operation 302, the apparatus includes means, such as the processing circuitry 12, memory 14, and/or the like, for altering the at least one graphical asset overlaid on the at least one graphical data placement region based at least on the environmental data, such as to be more consistent with the environmental data.

For example, altering a graphical asset may include adjusting a brightness level of the graphical asset to match or approximate a brightness level of the image. Displaying a bright graphical asset on a graphical data placement region in a dimly-lit environment may result in a distracting and/or jarring appearance. In this regard, the graphical asset can be altered to match the brightness of the surrounding environment. Similarly aspects such as color tones, saturation, and/or the like of a graphical asset may be altered depending on the environmental data. For example, brightness and warmth may be increased for graphical assets being displayed on a bright summer day, and reduced under rainy or cloudy weather conditions.

In some embodiments, altering the graphical asset may comprise modifying or augmenting the graphical asset in some manner as described above. In some embodiments, altering the graphical asset may comprise replacing the graphical asset with a different graphical asset altogether based on the environmental conditions. For example, based on a time of day at which the image was taken, a graphical asset that is overlaid on a graphical data placement region may differ. For example, a breakfast promotional advertisement may be overlaid on a façade of a restaurant during morning hours, whereas a dinner promotional advertisement may be overlaid on the façade during afternoon or evening hours.

As described above, although the object of interest within an image may be identified in various manners, the object of interest within the image that has been captured by the image capture device may be identified by a trained query processing module 22 in one example embodiment. The query processing module may comprise a deep learning model, such as a neural network, e.g., a convolutional neural network (CNN) and, more particularly, a Residual Neural Network (ResNet). The query processing module of an example embodiment may also comprise a pyramidal structure of neural network layers configured to extract features from one or more query images and to utilize the digital signature to identify the corresponding object of interest within the one or more query images.

The query processing module 22 may be trained using: (i) one or more digital signatures of respective objects of interest and the context associated therewith and (ii) one or more query images to identify the object of interest within the one or more query images based upon the digital signature of the same object of interest in combination with the context with which the object of interest is associated. As described above, "context" may refer to a portion of an image that is adjacent to or surrounds the object of interest. For example, in an instance in which the object of interest in a reference image is a particular building, the context may comprise one or more buildings or other objects that are in close proximity to the particular building. In an embodiment in which the object of interest is demarcated, such as with an image mask, the context is generally represented by a portion of the reference image that is outside of, but adjacent or otherwise proximate to the image mask. In at least some embodiments, the object of interest is stationary (e.g., a building), and the context surrounding the object of interest is also stationary (e.g., neighboring buildings, locations, or the like).

By taking into account the context associated with an object of interest in the generation of the digital signature, a particular instance of the object of interest may be identified within a query image. For example, in an example embodiment in which the object of interest is a particular franchised restaurant located at a specific location, the generation of a digital signature of the particular restaurant that takes into account the context associated the specific location permits the particular restaurant to be distinguished from other restaurants of the same franchise that are at different locations. Although the different restaurants may all have the same appearance, the context associated with the restaurants is different from one restaurant to another, thereby allowing the digital signature to distinguish the restaurants. By taking the context associated with an object of interest into account in the generation of the digital signature, the query processing module is capable of identifying a particular object of interest within a query image even if occlusions or distortions in the query image prevent the particular object of interest from being fully visible in the query image.

In some embodiments, the method, apparatus 10 and computer program product may be configured to train the query processing module 22 to identify objects of interest within an image by utilizing digital signatures of various objects of interest that have been identified in one or more reference images as well as at least some of the context associated with the objects of interest. Although the digital signatures that are utilized by the query processing module for comparative purposes may be generated in various manners, the method, apparatus and computer program product of an example embodiment are configured to train a signature encoding module 20 to generate a digital signature representative of an object of interest and at least some of the context associated with the object of interest within a reference image and to correspondingly train the query processing module to utilize the digital signature to identify the object of interest within the image captured by an image capture device. In this regard, a trained query processing module may be trained to efficiently recognize and highlight objects of interest within images.

The query processing module 22 may be trained concurrently with a signature encoding module 20, in some embodiments described further below. In some embodiments, the signature encoding module and query processing module may be configured in various manners, but, in one embodiment, are each deep learning models. The respective deep learning models of the signature encoding module and the query processing module may be trained concurrently. As shown in FIG. 4, by way of example, but not of limitation, the signature encoding module 420 and/or the query processing module 430 may each comprise a pyramidal network and, in one embodiment, a CNN, such as a ResNet. In some embodiments, the query processing module 430 may include an aggregating layer configured to combine a digital signature generated by the signature encoding module with a query image 445 decomposition.

The signature encoding module 420 may be configured, using a reference image 405 having an area 410 of the image demarcated (e.g., by masking the reference image) to signify an object of interest (e.g., place of interest, or the like), to generate one or more digital signatures (e.g., sequences of bytes) that represent the object of interest in the context of the reference image. While reference images may be demarcated by using image masks during the training process, it is to be appreciated that other methods of demarcation may be used. As also described below, digital signatures (e.g., digital signatures generated by the signature encoding module 420) are dependent not only upon the object of interest, but also upon at least some of the context associated with the object of interest. This context may include the environment or other surroundings located about the object of interest. In other words, the context associated with an object of interest is context that is visible when viewing the object of interest and, for at least some objects of interest, is external to the object of interest. By way of example, in an instance in which a particular building is the object of interest, the context may include other adjacent buildings as well as other features, e.g., statues, street signs, open spaces, etc., in the vicinity of the building.

During training, a provided reference image 405 depicts an object of interest. For example, the reference image may be an image generated by a camera (e.g., a photograph or a frame from a video) such that the image depicts real-world content (e.g., buildings, roads, signs, landmarks, and/or other objects). In this regard, the object of interest may be content that is desired to be located in one or more other images. The object of interest is stationary in at least some example embodiments.

Further, during training, the reference image may be modified such that the object of interest within the reference image is demarcated. The object of interest may be demarcated in the reference image in various manners. For example, in some embodiments, in addition to a reference image, an image mask that demarcates the object of interest in the reference image may also be provided to the signature encoding module. For example, an image mask may take the form of a matrix having elements that correspond to one or more pixels of the reference image. In this example embodiment, the matrix may be configured to designate certain pixels of the reference image that include the object of interest. In other embodiments, the object of interest may be demarcated within the reference image itself. Demarcation of the object of interest may occur prior to the reference image being provided to the signature encoding module 420.

Once the reference image and demarcation of the object of interest within the reference image are provided to the signature encoding module 420, the signature encoding module may generate a digital signature for the object of interest and for at least some context associated with the object of interest.

In some embodiments, the signature encoding module 420 may comprise a plurality of neural network layers configured to decompose the reference image and a representation therein of the object of interest and at least some of the context associated with the object of interest to extract features therefrom and to derive a digital signature representing a combination of the object of interest and at least some of the context associated with the object of interest. For example, in some embodiments, the digital signature may be derived based on the object of interest and at least some context associated with the object of interest, such as one or more objects in the reference image other than the object of interest.

In some embodiments, digital signatures may be generated by analyzing the reference image at different (e.g., higher) resolutions and extracting additional features from the reference image as the reference image is advanced from a courser resolution processed by one neural network layer to a finer resolution processed by another, subsequent neural network layer.

As FIG. 4 illustrates, a signature encoding module 420 is provided with a reference image 405 having a demarcated object 410 of interest. As shown, the signature encoding module 420 comprises a plurality of neural network layers in a pyramidal structure configured to decompose the reference image and a representation therein of the object of interest to extract features therefrom. As a result, the signature encoding module is configured to derive a digital signature 440 representing the object of interest that was demarcated in the reference image along with at least some of the context associated with the object of interest.

In some embodiments, the digital signature may comprise a sequence of bits and bytes unique to the object of interest and the associated context. In this regard, the digital signature may be derived based on both the object of interest and at least some of its context such that different digital signatures would be generated for identical objects of interest if those objects of interest were in different locations with different context associated therewith. In other words, a digital signature may be a portable, compact digital representation of an object of interest, such as a place, structure, or entity, that can be used to locate the object of interest using computer vision.

In some embodiments, the signature encoding module 420 and query processing module 430 may perform operations on multiple images (e.g., reference images 405 and query images 445) concurrently during the training process. In some embodiments, once a digital signature is generated by the signature encoding module, the digital signature may be stored (e.g., in memory and/or database 24) and used in other processes (e.g., query processing module processes) without having to use the original reference images and associated masks. In this regard, the stored digital signature provides a compact representation of an object of interest, thereby providing a technical advantage in terms of storage efficiency and the speed and efficiency with which digital signatures representative of objects of interest may be retrieved and processed, such as in conjunction with the identification of an object of interest within a query image. The digital signatures may be stored in combination with information defining the location at which the respective reference image was captured and, in some embodiments, in combination with a representation of the image, such as an encoded representation, e.g., a hash, of the image or the actual image itself.

In the training process, once the object of interest has been identified in the query image 445, at least one of the signature encoding module 420 or the query processing module 430 may be modified based upon a difference between the object of interest identified within the query image and the object of interest marked in the reference image. For example, the object of interest identified within the query image and the object of interest marked in the reference image may be compared using a loss function with at least one of the signature encoding module or the query processing module then being modified based upon a result of the loss function. In some embodiments, at least one of the signature encoding module and the query processing module may be modified to reduce a difference between the object of interest identified within the query image and the object of interest marked in the reference image.

By repeating the foregoing process a plurality of times by providing the signature encoding module 420 with a reference image with an object of interest being marked therein and then utilizing the resulting digital signature as an input along with one or more query images 445 to the query processing module 430 and then modifying the signature encoding module and/or the query processing module based upon a difference between the object of interest identified within the query image and the object of interest marked in the reference image, the signature encoding module and the query processing module may be trained to perform more accurately. In this regard, the signature encoding module may be trained to generate digital signatures that permit an object to interest to be accurately identified, and the query processing module may be trained to accurately identify the object of interest based upon a digital signature representative of the object of interest and at least some of the context associated therewith. Moreover, as a result of the training of the signature encoding module, the context (such as in terms of the amount of the context and/or the type of context) that is included with the object of interest in conjunction with the generation of the digital signature is a function of the training of the signature encoding process with the context that is included being defined to be that context that allows digital signatures to be generated that permit an object to interest to be accurately identified.

Although a signature encoding module 20 may be utilized to generate a plurality of digital signatures representative of respective objects of interest as well as at least some context associated therewith, the digital signatures may be generated in other manners and stored for subsequent reference by the query processing module 22 in other example embodiments. Additionally, even in instances in which the digital signatures are generated by a signature encoding module 20 that is trained concurrently with the training of the query processing module 22, the apparatus 10 including the query processing module 22 may subsequently reference the digital signatures in order to identify an object of interest in a query image that has been captured by an image capture device without further involvement by the signature encoding module 20.

By utilizing the digital signatures, the objects of interest may subsequently be identified in received images captured by an image capture device and graphical presentation data may be subsequently displayed in or in near real-time and in a manner that conserves processing resources and is more timely than at least some other image analysis techniques.

FIGS. 2 and 3 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, although a supervised learning technique has been described in conjunction with the training of the signature encoding module 20 and the query processing module 22, various forms of unsupervised learning or partially supervised learning may, instead, be employed in other example embodiments. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving one or more images generated by an image capture device;
   determining one or more digital signatures associated with one or more objects within the one or more images;
   based on the one or more digital signatures, determining graphical data placement information comprising one or more graphical data placement regions for the one or more objects;
   receiving graphical presentation data comprising one or more graphical assets; and
   causing display of the graphical presentation data, wherein causing display comprises overlaying at least one graphical asset of the one or more graphical assets on the at least one graphical data placement region.

2. The method of claim 1, further comprising:
causing transmission of the graphical data placement information to a graphical presentation data marketplace service,
wherein the graphical presentation data is received from the graphical presentation data marketplace service.

3. The method of claim 1, further comprising:
determining environmental data associated with the one or more images; and
altering the at least one graphical asset overlaid on the at least one graphical data placement region based at least on the environmental data.

4. The method of claim 3, wherein the environmental data comprises at least one of a time of day, a weather status, or a lighting condition for the one or more images.

5. The method of claim 3, wherein altering the at least one graphical asset comprises replacing the at least one graphical asset with another graphical asset of the one or more graphical assets, wherein the another graphical asset is selected based on the environmental data.

6. The method of claim 1, further comprising:
receiving position information associated with the image capture device comprising at least one of a position or orientation of the image capture device,
wherein the received graphical presentation data is further based on the position information.

7. The method of claim 1, wherein the graphical data placement information further comprises positioning information associated with the one or more graphical data placement regions and demographic data associated with a user of the image capture device.

8. An apparatus comprising processing circuitry and at least one memory including computer program code instructions, the computer program code instructions configured to, when executed by the processing circuitry, cause the apparatus to:
receive one or more images generated by an image capture device;
determine one or more digital signatures associated with one or more objects within the one or more images;
based on the one or more digital signatures, determine graphical data placement information comprising one or more graphical data placement regions for the one or more objects;
receive graphical presentation data comprising one or more graphical assets; and
cause display of the graphical presentation data, wherein causing display comprises overlaying at least one graphical asset of the one or more graphical assets on the at least one graphical data placement region.

9. The apparatus of claim 8, wherein the computer program code instructions are further configured to, when executed by the processing circuitry, cause the apparatus to:
cause transmission of the graphical data placement information to a graphical presentation data marketplace service,
wherein the graphical presentation data is received from the graphical presentation data marketplace service.

10. The apparatus of claim 8, wherein the computer program code instructions are further configured to, when executed by the processing circuitry, cause the apparatus to:
determine environmental data associated with the one or more images; and
alter the at least one graphical asset overlaid on the at least one graphical data placement region based at least on the environmental data.

11. The apparatus of claim 10, wherein the environmental data comprises at least one of a time of day, a weather status, or a lighting condition for the one or more images.

12. The apparatus of claim 10, wherein altering the at least one graphical asset comprises replacing the at least one graphical asset with another graphical asset of the one or more graphical assets, wherein the another graphical asset is selected based on the environmental data.

13. The apparatus of claim 8, wherein the computer program code instructions are further configured to, when executed by the processing circuitry, cause the apparatus to:
receive position information associated with the image capture device comprising at least one of a position or orientation of the image capture device,
wherein the received graphical presentation data is further based on the position information.

14. The apparatus of claim 8, wherein the graphical data placement information further comprises positioning information associated with the one or more graphical data placement regions and demographic data associated with a user of the image capture device.

15. A computer program product comprising at least one non-transitory computer-readable storage medium having computer-executable program code instructions stored therein, the computer-executable program code instructions comprising program code instructions configured to:
receive one or more images generated by an image capture device;
determine one or more digital signatures associated with one or more objects within the one or more images;
based on the one or more digital signatures, determine graphical data placement information comprising one or more graphical data placement regions for the one or more objects;
receive graphical presentation data comprising one or more graphical assets; and
cause display of the graphical presentation data, wherein causing display comprises overlaying at least one graphical asset of the one or more graphical assets on the at least one graphical data placement region.

16. The computer program product of claim 15, wherein the computer-executable program code instructions further comprise program code instructions configured to:
cause transmission of the graphical data placement information to a graphical presentation data marketplace service,
wherein the graphical presentation data is received from the graphical presentation data marketplace service.

17. The computer program product of claim 15, wherein the computer-executable program code instructions further comprise program code instructions configured to:
determine environmental data associated with the one or more images; and
alter the at least one graphical asset overlaid on the at least one graphical data placement region based at least on the environmental data.

18. The computer program product of claim 17, wherein altering the at least one graphical asset comprises replacing the at least one graphical asset with another graphical asset of the one or more graphical assets, wherein the another graphical asset is selected based on the environmental data.

19. The computer program product of claim 15, wherein the computer-executable program code instructions further comprise program code instructions configured to:
- receive position information associated with the image capture device comprising at least one of a position or orientation of the image capture device,
- wherein the received graphical presentation data is further based on the position information.

20. The computer program product of claim 15, wherein the graphical data placement information further comprises positioning information associated with the one or more graphical data placement regions and demographic data associated with a user of the image capture device.

\* \* \* \* \*

UNITED STATES PATENT AND TRADEMARK OFFICE
CERTIFICATE OF CORRECTION

| | |
|---|---|
| PATENT NO. | : 11,587,253 B2 |
| APPLICATION NO. | : 17/132876 |
| DATED | : February 21, 2023 |
| INVENTOR(S) | : Ofer Melnik et al. |

Page 1 of 1

It is certified that error appears in the above-identified patent and that said Letters Patent is hereby corrected as shown below:

In the Claims

In Column 21, Line 39, Claim 8, delete "circuity," and insert -- circuitry, --, therefor.

In Column 21, Line 57, Claim 9, delete "circuity," and insert -- circuitry, --, therefor.

In Column 21, Line 65, Claim 10, delete "circuity," and insert -- circuitry, --, therefor.

In Column 22, Line 14, Claim 13, delete "circuity," and insert -- circuitry, --, therefor.

Signed and Sealed this
Seventh Day of November, 2023

Katherine Kelly Vidal
*Director of the United States Patent and Trademark Office*